Patented Oct. 15, 1940

2,217,981

UNITED STATES PATENT OFFICE 2,217,981

PROCESS FOR REFINING LEAD

Raymond L. Hallows, Joplin, Mo., assignor to The Eagle-Picher Lead Company, Cincinnati, Ohio, a corporation of Ohio No Drawing. Application August 22, 1939, Serial No. 291,377

14 Claims. (Cl. 75—78)

The invention relates to an improved method for the removal from lead of impurities such as copper which can be preferentially sulphidized and an improved method for treating the drosses and residues formed during the removal of the impurities.

In a general way, it can be said that until recently the usual practice of removing copper from lead was to subject it, after drossing to the Parkes process, which consists of stirring zinc into the lead bullion above its melting point and removing the solid crusts formed on cooling. In removing copper in this way there is more zinc consumed than would otherwise be needed for the removal of the precious metals. Likewise, during the subsequent processing of the zinc crusts for the recovery of gold and silver, the copper must be removed in the form of a coppery litharge which must be subsequently treated for the recovery of the lead and the copper. It was also common practice to use zinc for the removal of copper from lead bullion which did not carry precious metal. This was practiced as a modification of the Parkes process mentioned above and obviously was expensive because of the initial cost of the zinc and also because the zinc added to the lead must be removed from it by oxidizing in a reverberatory furnace or removed with chlorine gas as zinc chloride, with sodium nitrate, and other well known processes. Such a modified Parkes process was decidedly expensive when practiced for copper removal, since the entire cost is for removal of copper alone and exclusive of precious metals.

Another method sometimes practiced has been to stir elemental sulphur into blast furnace bullion containing antimony, arsenic and copper. A large amount of dross is formed containing a major portion of the copper contained in the bullion. This large amount of dross must be roasted and resmelted or else treated in a reverberatory furnace together with other drosses for the production of matte and speiss. This practice is not applicable to soft lead bullion containing little or no antimony or arsenic.

Attempts have been made to remove copper by means of sodium hydroxide and elemental sulphur. These have not proven successful because of the excessive amount of reagents required as the method was practiced, the poor removal of copper at the temperatures employed (400°–500° C.) and the difficulty of processing the drosses produced for the recovery of their lead and copper content.

It is an object of this invention to provide an improved method for removal from lead of impurities such as copper, which can be sulphidized. Another object of this invention is to provide for treatment of the drosses containing the impurities by further utilization of the reagents for the removal itself. Another object is to materially lessen the percentage of dross made containing the impurities.

A further object of the invention is to provide a method of maximum simplicity, efficiency, economy and ease of assembly and operation and by reason of simplicity a corresponding reduction in operating costs as compared to present processes.

The invention more particularly comprises the addition of elemental sulphur or sulphur containing compounds such as alkali sulfide or thiosulfate and sodium hydroxide or potassium hydroxide or alkali sulfide alone to the molten lead bath to be purified and stirring them through the bath of molten lead at temperatures slightly above its melting point (325°–375° C.). To carry out the process, lead containing copper and other impurities is charged to a refining kettle, heated from below, to a temperature varying from 325° to 375°. The operation is performed in and above the refining kettles by means of conventional mixing apparatus comprising an ordinary motor-driven impeller-type lead mixer, preferably of the portable type, which is swung into position over the molten bath and any dross removed before starting the impeller, which is operated in such a manner as to produce a decided vortex in the center of the bath.

Elemental sulphur and sodium hydroxide are then added while the stirring continues. They, together with the dross formed by the reaction with the impurities, are drawn below the surface at the vortex, rise again around the edge, thus coming into intimate contact with the lead bath.

After reaction is completed, the stirring apparatus is removed and the dross skimmed off. The number of additions of the reagents, as well as the quantity thereof, may be varied with respect to such factors as amount of impurities in the lead subjected to treatment by my process, the size of the refining kettle and the action of the stirring apparatus I have found the control of temperature to be important. If the temperature of the lead bath is allowed to rise over 375° C. the extent of copper removal is diminished.

In order that the full effect of the reagents may be obtained and utilized, the dross removed from a bath of lead, from which practically all of the copper has been removed, may be used for the removal of copper from a subsequent bath containing a high percentage of copper. In other words, the reagents may be utilized in a counter-current manner for the removal of copper from several baths of lead. In this way full and economical utilization of their purifying power may be obtained. The addition of reagents to the kettle and subsequent removal after stirring, is repeated until the desired purity is obtained. Recourse must be had to chemical control in order to determine when the copper and other impurities have been sufficiently removed, although an experienced operator knowing the initial copper content of the bath undergoing treatment can judge approximately the number of treatments needed. The proportions of elemental sulphur and sodium hydroxide, one to the other, may be varied. By way of example it has been found that one part of sulphur to three parts of sodium hydroxide is usually satisfactory.

The further processing of the drosses containing the impurities is accomplished in a reverberatory furnace. Simple fusion of these drosses will yield a very substantial lead fall. This is believed due to reaction of sodium hydroxide with the lead salts formed in the dross. Thus the sodium hydroxide used in the invention serves the two-fold purpose of assisting in the removal of the impurities and then subsequently assisting in the reduction of the lead from the resulting drosses. The products of the fusion are a light-weight dross which contains the sodium presumably in the form of a salt, a matte composed of lead and copper, and metallic lead. The dross containing the sodium is substantially lead free and can be discarded or further processed for the recovery of sodium sulphate and like salts. The matte containing the lead and copper is sold or subsequently processed for the recovery of its lead and copper content. It is a very small percentage of the original impure lead. If desired the lead produced from the fusion may be returned to the start of the purification system, thus being in closed circuit.

Without desiring to restrict ourselves to the proportions named, we will give examples of the method for carrying out the process which will possess the advantages described, it being understood that the percentages named are approximate only and that the relative proportions of the material may vary to a reasonable extent without impairing the results.

Example I

A bath of molten lead weighing approximately 65 tons and heated slightly above the melting point of lead (630–700° F.) was prepared. Before treatment, it contained .06% copper and .0007% antimony. A lead mixer of the impeller type was then moved into position over the molten bath and driven at a speed which produced a pronounced vortex in the center. In this condition the dross resulting from the counter-current treatment of two preceding baths of lead with 450# sodium hydroxide and 150# elemental sulphur was added to the lead and thoroughly stirred into the lead for a period of twenty minutes.

At the end of this time, the stirrer was removed from the bath and the resulting dross skimmed off. The bath was found to contain .03% copper and the dross weighed 1500# and contained 5.5% copper and 60% lead. This dross was set aside for subsequent processing for its lead and copper content as will be explained later. The mixer was again moved into position and driven at a speed to produce a pronounced vortex in the center of the lead bath, whereupon a skim resulting from the counter-current treatment of one preceding kettle with 450# sodium hydroxide and 150# elemental sulphur was added. This was well stirred in for a period of 20 minutes. The stirrer was removed and the bath skimmed as before. The skim removed was set aside for further counter-current treatment of a following bath. The lead bath after this treatment was found to contain .008% copper. The stirrer was again moved into position and driven at a speed to produce a pronounced vortex in the center of the lead bath as before. 450# sodium hydroxide and 150# elemental sulphur were then added and well stirred into the lead bath for twenty minutes. At the end of this period the stirrer was removed and the dross skimmed from the kettle. This dross was set aside for the counter-current treatment of two following baths. The lead bath after this treatment was found to contain .0007% copper and was then ready to be cast as corroding lead.

The dross produced from the first treatment above was charged to a reverberatory furnace and heated to about 2000° F. After being maintained at this temperature for one hour the products of the fusion were tapped from the furnace. It was found that the 1500# of dross charged to the furnace had yielded after fusion 800# metallic lead, 330# matte containing 25% copper and 30% lead, and 370# of soda dross containing a trace of lead. The metallic lead was returned to a subsequent bath for purification. The matte portion was retained for sale for its copper content and the soda dross was discarded.

Example II

A bath of molten lead weighing approximately 65 tons and heated slightly above the melting point of lead (630–700° F.) was prepared. Before treatment, it contained .055% copper and .000% antimony. A lead mixer of the impeller type was then moved into position over the molten bath and driven at a speed which produced a pronounced vortex in the center. In this condition the dross resulting from the counter-current treatment of two preceding baths of lead with 400# sodium hydroxide and 130# elemental sulphur was added to the lead and thoroughly stirred into the lead for a period of twenty minutes.

At the end of this time, the stirrer was removed from the bath and the resulting dross skimmed off. The bath was found to contain .025% copper and the dross weighed 1200# and contained 5.9% copper and 65% lead. This dross was set aside for subsequent processing for its contained lead and copper as will be explained later. The mixer was again moved into position and driven at a speed to produce a pronounced vortex in the center of the lead bath, whereupon a skim resulting from the counter-current treatment of one preceding kettle with 400# sodium hydroxide and 130# elemental sulphur was added. This was well stirred in for a period of 20 minutes. The stirrer was removed and the bath skimmed as before. The skim removed was set aside for further counter-current treatment of a following bath. The lead bath after this treatment was found to contain .005% copper. The stirrer was again moved into position and driven at a speed to produce a pronounced vortex in the center of the lead bath as before. 400# sodium hydroxide and 130# elemental sulphur were then added and well stirred into the lead bath for twenty minutes. At the end of this period the stirrer was removed and the dross skimmed from the kettle. This dross was set aside for the counter-current treatment of two following bath. The lead bath after this treatment was found to contain .0007% copper and was then ready to be cast as corroding lead.

The dross produced from the first treatment above was charged to a reverberatory furnace and heated to about 2000° F. After being maintained at this temperature for one hour the products of the fusion were tapped from the furnace. It was found that the 1200# of dross charged to the furnace had yielded after fusion 700# metallic lead, 300# sulphide matte containing 23.5% copper and 30% lead, and 200# of soda dross containing a trace of lead. The metallic lead was returned to a subsequent bath for purification. The sulphide matte portion was retained for sale for its copper content and the soda dross was discarded.

Having thus described my invention, what I claim as new and desire to secure by Letters Patent is:

1. The herein described process of removing copper from lead which comprises stirring the molten impure lead at a temperature varying from 325° C. to 375° C. in such a manner as to produce a pronounced vortex and adding a purifying agent comprising elemental sulphur and sodium hydroxide and removing the dross thus formed.

2. The herein described process of removing copper from lead which comprises stirring the molten impure lead in such a manner as to produce a pronounced vortex, maintaining the bath at a temperature varying from 325° C. to 375° C. and adding a purifying agent selected from the group comprising elemental sulphur alkali sulfide, and alkali thiosulfate, together with alkali hydroxide and removing the dross thus formed.

3. The herein described process of refining molten impure lead by removing copper therefrom which comprises slowly adding elemental sulphur and sodium hydroxide to a bath of molten impure lead at a temperature varying from 325° C. to 375° C., bringing the purifying agent intimately into contact with all portions of the lead bath as rapidly as it is added, and removing the dross thus formed.

4. The herein described process of removing copper from lead which comprises heating the lead to a temperature varying from 325° C. to 375° C. generating an impelling pressure to stir the lead with a swirling motion and produce a pronounced vortex, adding a purifying agent selected from the group comprising elemental sulphur, and alkali sulfide, alkali thiosulfate, together with hydroxide, and removing the dross thus formed.

5. The herein described process of refining molten impure lead at a temperature varying from 325° C. to 375° C. by removing copper which is present as an impurity, which comprises adding a purifying agent comprising elemental sulphur and sodium hydroxide to a bath of molten impure lead and bringing the same into contact with all portions of the lead bath and removing the dross thus formed.

6. A method of refining impure molten lead containing copper as an impurity at a temperature varying from 325° C. to 375° C., which comprises adding elemental sulphur and sodium hydroxide while maintaining a vortex in the middle of the bath and bringing the same into contact with all portions of the lead bath to remove the copper.

7. The improvement in the process of refining molten, impure lead by removing copper therefrom, which comprises slowly adding elemental sulphur and sodium hydroxide to a bath of molten, impure lead at a temperature varying from 325° C. to 375° C., bringing the purifying agent intimately into contact with all portions of the lead bath, removing the dross from the bath, and recirculating the dross in a bath of molten, impure lead to remove copper therefrom.

8. The improvement in the process of removing the copper from lead which comprises heating the lead to a temperature varying from 325° C. to 375° C., generating an impelling pressure to produce a pronounced vortex, adding a purifying agent selected from the group comprising elemental sulphur, alkali sulfide, and alkali thiosulfate, together with alkali hydroxide, removing the dross from the bath and recirculating the dross in a bath of molten impure lead to remove the copper therefrom.

9. The method of removing copper from a dross containing sodium hydroxide and lead sulphide which comprises fusing the dross, liberating lead, forming a matte containing copper sulfide and forming a dross containing sodium sulfide.

10. The method of removing copper from a dross formed by admixing sulphur and sodium hydroxide with lead containing copper as an impurity which comprises fusing the dross, liberating lead, forming a matte containing copper sulfide and forming a dross containing sodium sulfide.

11. The method of removing copper from a dross formed by a purifying agent selected from the group comprising elemental sulphur, alkali sulphide and alkali thiosulphate together with alkali hydroxide, in admixture with lead containing copper, which comprises fusing the dross, liberating lead, forming a matte containing copper sulfide and forming a dross containing sodium sulfide.

12. In the herein described process of removing copper from molten impure lead at a temperature from 325° C. to 375° C. the step which comprises adding a purifying agent comprising elemental sulphur and sodium hydroxide to the lead bath.

13. In the herein described process of removing copper from molten impure lead at a temperature from 325° C. to 375° C. the step which comprises adding to the lead bath a purifying agent selected from the group comprising elemental sulphur, alkali sulfide and alkali thiosulfate, together with alkali hydroxide.

14. The herein described process of removing copper from lead which comprises stirring the molten impure lead in such a manner as to produce a vortex, maintaining the bath at a temperature varying from 325° C. to 375° C., adding a purifying agent comprising sodium sulfide and removing the dross thus formed.

RAYMOND L. HALLOWS.